United States Patent
Guffens et al.

(10) Patent No.: US 7,302,552 B2
(45) Date of Patent: Nov. 27, 2007

(54) SYSTEM FOR PROCESSING VLIW WORDS CONTAINING VARIABLE LENGTH INSTRUCTIONS HAVING EMBEDDED INSTRUCTION LENGTH IDENTIFIERS

(75) Inventors: Jan Guffens, Linden-Lubbeck (BE); Ludwig Callewaert, Oud-Heverlee (BE); Koenraad Van Nieuwenhove, Asse (BE)

(73) Assignee: Arm Limited, Cambridge (GB)

( * ) Notice: Subject to any disclaimer, the term of this patent is extended or adjusted under 35 U.S.C. 154(b) by 224 days.

(21) Appl. No.: 10/963,722

(22) Filed: Oct. 14, 2004

(65) Prior Publication Data

US 2005/0257028 A1   Nov. 17, 2005

(30) Foreign Application Priority Data

May 17, 2004   (GB) ................. 0410986.4

(51) Int. Cl.
*G06F 9/30* (2006.01)
(52) U.S. Cl. .................. 712/204; 712/24; 712/209
(58) Field of Classification Search ............. 712/24, 712/204, 209
See application file for complete search history.

(56) References Cited

U.S. PATENT DOCUMENTS

| | | | |
|---|---|---|---|
| 5,057,837 A | | 10/1991 | Colwell et al. |
| 5,761,470 A | * | 6/1998 | Yoshida ............ 712/210 |
| 5,826,054 A | * | 10/1998 | Jacobs et al. ........ 712/213 |
| 5,922,065 A | * | 7/1999 | Hull et al. .......... 712/24 |
| 6,321,322 B1 | * | 11/2001 | Pechanek et al. ..... 712/24 |
| 6,925,548 B2 | * | 8/2005 | Matsuo ............. 712/24 |

FOREIGN PATENT DOCUMENTS

| WO | WO 2004/017197 | 2/2004 |
|---|---|---|
| WO | WO 2004/029796 | 4/2004 |

OTHER PUBLICATIONS

Kissell, Kevin D., MIPS16: High-density MIPS for the Embedded Market, RTS '97: Real Time Systems and Embedded Applications, 1997.*
Product Description MIPS16 Application-Specific Extension, MIPS Technologies, Inc., V 1.3, Jan. 30, 1997.*
Yeager, Kenneth C., The MIPS R10000 Superscalar Microprocessor, IEEE Micro, 1996.*
Tanenbaum, Andrew S., Structured Computer Organization, Second Edition, Prentice-Hall, Inc., 1984, pp. 10-12.*

* cited by examiner

*Primary Examiner*—Richard L. Ellis
(74) *Attorney, Agent, or Firm*—Nixon & Vanderhye P.C.

(57) ABSTRACT

A processor is described including a plurality of data path elements which independently perform in parallel different data processing operations. Program instructions are provided which are decoded to generate control signals for controlling the data path elements. Multiple instruction sets are supported with the same data processing operation to be performed by the same data path element being differently encoded within different instructions of different instruction sets. This enables code compaction when little parallelism may be achieved and full parallelism to be specified when this is possible.

30 Claims, 6 Drawing Sheets

SYSTEM FOR PROCESSING VLIW WORDS CONTAINING VARIABLE LENGTH INSTRUCTIONS HAVING EMBEDDED INSTRUCTION LENGTH IDENTIFIERS

BACKGROUND OF THE INVENTION

1. Field of the Invention

This invention relates to the field of data processing. More particularly, this invention relates to data processing systems having a plurality of data path elements operable independently to perform in parallel respective data processing operations specified by a program instruction, such as, for example, so called very long instruction word (VLIW) processors and measures to reduce program code size for such systems.

2. Description of the Prior Art

The known TMS3206xx processor produced by Texas Instruments is designed for high-speed operation (e.g. 1 GHz) and consequently contains a simple instruction decoder. This processor uses 32-bit instructions. Instructions are loaded from a memory in a 256-bit fetch packet containing eight 32-bit instructions. Each instruction contains a bit (the P bit) that indicates if the next instruction in the fetch packet can be executed in the same clock cycle. Instructions that execute in the same clock cycle are called the execute packet. Since an execute packet cannot cross a fetch packet boundary, the P bit of the last instruction in the fetch packet must be cleared. If a functional unit within the processor is not addressed by an instruction within the execute packet, then it performs a default operation, such as a Nop.

The SC140 Processor produced by StarCore builds its instruction words up out of 16-bit words. Most instructions consist of a single 16-bit instruction word. Some instructions need two instruction words. An instruction prefix word (16 or 32 bits) can be specified. This prefix is used to extend the number of addressable regiaster fields, conditionally execute instructions (guarded execution), or to specify the number of instructions to be executed in one clock cycle. If no prefix word is used, then the instructions are linked together using a bit in the instructions in a similar way to the TMS320C6xx processor discussed above.

Within the SC 140 processor, instructions are fetched from the memory in 128-bit units (8*16-bit words). Up to six functional units can be controlled in one clock cycle. The instructions that execute in one clock cycle can span a 128-bit boundary. An instruction alignment circuit performs necessary alignment operations when the instructions span such a boundary.

The Thumb enabled scalar processors produced by ARM Limited are able to execute either 32-bit ARM code or 16-bit Thumb code. The Thumb instruction set does not provide all instructions that can be specified within the ARM instruction set.

VLIW processors such as the TMS320C6xx and SC140 processors are advantageous in providing for highly parallel execution of data processing operations. However, as the complexity of processing operations to be performed steadily increases, the high program memory storage requirements associated with these VLIW processors become a significant disadvantage.

SUMMARY OF THE INVENTION

Viewed from one aspect the present invention provides apparatus for processing data, said apparatus comprising:

an instruction decoder operable to decode one or more instruction fields within a program instruction to generate at least control signals; and a plurality of data path elements responsive to said controls signals independently to perform in parallel respective data processing operations specified by said program instruction, at least some program instructions decoded by said instruction decoder allowing control signals for respective data path elements to be independently specified; wherein said instruction decoder is operable such that a given data processing operation to be performed by a data path element can be specified using differently encoded instruction fields in different program instructions.

The present technique recognises that in many real life processing applications to be performed, the high levels of parallelism provided by the very long instructions supported by VLIW processors are not exploited. As an example, whilst high degrees of parallelism may be achieved within a tight program loop performing digital signal processing type operations upon a large number of independent data values, such as pixel values, significant amounts of time will be spent executing control code and other code types in which there is little potential for parallelism. Having recognised these differing types of real life operation, the present technique provides multiple instruction encodings whereby the different instruction encodings that specify the same data processing operation can be targeted at different operational regimes. As an example, within control flow types of operation, it may be apparent that it is very common for only a single data path element to be active at any given time and accordingly smaller compressed program instructions can be used which only allow a single data path element to be active. Considerable program memory space can be saved by the assumption that all the other data path elements will take some specified default behaviour when a program instruction does not indicate a data processing operation which they are to perform. Conversely, when a portion of a computer program is encountered in which high degrees of parallelism may be exploited, then a different program instruction encoding may be used to enable a wider range of the data path elements to be simultaneously controlled and a wider range of data processing operations upon each of those data path elements to be specified. It is also possible that some intermediate length encodings will provide for the commonly used operations (e.g. add) of certain datapath elements, but not the less commonly used operations (e.g. bitwise invert).

Whilst it will be appreciated that the differently encoded respective instruction fields for the independent data path elements could vary their encoding in a variety of different manners, particularly useful ways of varying the encoding to improve code compression are to vary the bit lengths used for the instruction fields and the bit positions within the program instructions of the instruction fields.

In preferred embodiments the program instructions are divided into a plurality of instruction sets and the instruction decoder is responsive to an instruction set identifying field within the program instructions to determine which bits within the program instruction correspond to respective instruction fields for different data path elements. Accordingly, a plurality of different instruction sets may be provided suited to different operational regimes, such as a full functionality instruction set with large instructions suitable for highly parallel operation, a highly compressed instruction set in which only one data path element may be operative at any one time suited to highly non-parallel operation and intermediate instruction sets in which forms parallelism commonly encountered is supported but not the full level of potential parallelism.

The instruction set decoder is advantageously responsive to the instruction set identifier to determine program instruction length in order to deal with variable program instruction lengths within the system.

The differently encoded instruction fields serve to represent different sets of data processing operations that can be performed by the respective data path elements. Desireably some of these sets are subsets of others and include the most commonly occuring processing operations which it is desired to specify.

Another preferred way of improving program instruction compression is to support reduced operand ranges within the smaller instructions, such as a reduced range of register specifiers, a reduced range of jump addresses for program branches, a reduced set of functionality (e.g. fewer supported operation types) or a reduced range of immediate values.

An instruction field may relate to only a single possible data path element. Alternatively, improved compression can be achieved in some circumstances when an instruction set identifier itself specifies which data path element it controls. This effectively yields a form of tree encoding/decoding structure which may be readily adapted to the particular circumstances of the processors operation.

It will be appreciated that with different program instructions, differing numbers of data path elements will be active and inactive. Data path elements which are not specified a particular processing operation by a given program instruction will perform a default operation, such as a Nop, or some pending operation, such as a multicycle operation that was previously initiated.

The efficiency with which the program may be stored within memory is improved in embodiments in which the program instructions are readable in fixed length memory accesses which contain at least portions of a plurality of program instructions and a rotating and address incrementing mechanism is used to align program instructions for supply to the instruction decoder. The degree of alignment required can be determined from the instruction set identifiers which themselves specify or imply an instruction length. Furthermore, it is possible to split the memory into different banks with the program spread across those banks such that only those banks which require reading to replace portions of program instructions that have been consumed need be powered thus saving power.

Viewed from another aspect the present invention provides a method of processing data, said method comprising the steps of:

decoding one or more instruction fields within a program instruction to generate at least control signals; and in response to said controls signals controlling a plurality of data path elements independently to perform in parallel respective data processing operations specified by said program instruction, at least some program instructions allowing control signals for respective data path elements to be independently specified; wherein a given data processing operation to be performed by a data path element can be specified using differently encoded instruction fields in different program instructions.

Viewed from a further aspect the present invention provides a computer program product for controlling an apparatus for processing data having an instruction decoder operable to decode one or more instruction fields within a program instruction to generate at least control signals and a plurality of data path elements responsive to said controls signals independently to perform in parallel respective data processing operations specified by said program instruction; said computer program product comprising:

at least one program instruction including an instruction field with a first encoding specifying a given data processing operation to be performed by a data path element; and at least one different program instruction including a differently encoded instruction field with a second encoding different to said first encoding and specifying said given data processing operation to be performed by said data path element.

Viewed from a complementary aspect the present technique may also be considered to be a compiler program for producing computer programs in accordance with the above described features. The compiler effectively has a plurality of instruction sets from among which it may select program instructions to perform the data processing operations for which it is attempting to compile code.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
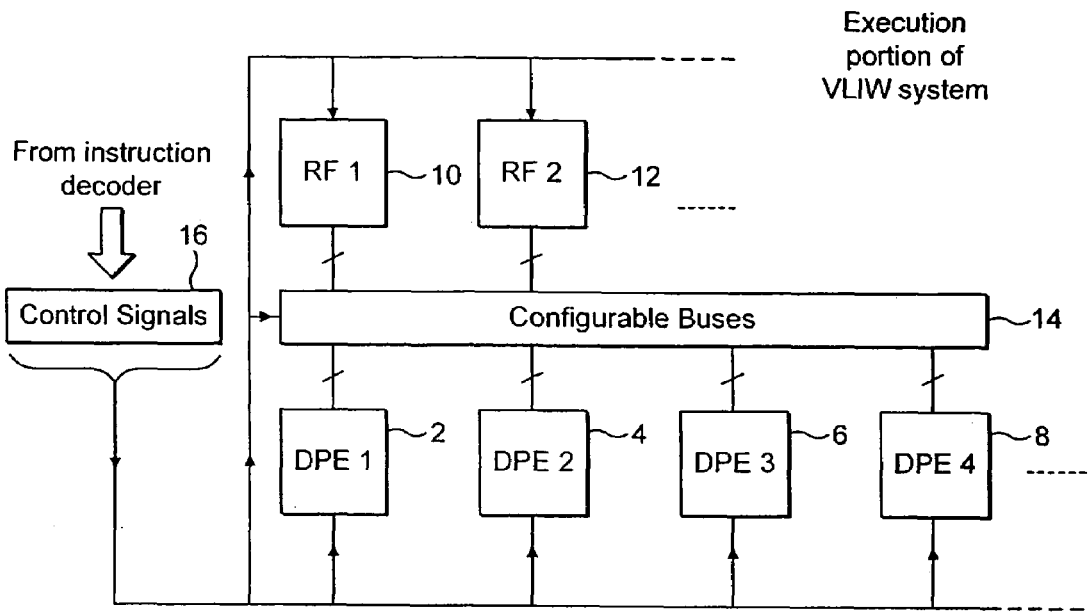
FIG. 1 schematically illustrates the data path of a VLIW processing system.

FIG. 1 shows a portion of a VLIW processor including a plurality of independently controllable data path elements 2, 4, 6, 8, which may, for example, be elements such as an adder, a multiplier, a shifter, an alu, a floating point unit, or other functional unit. These data path elements 2, 4, 6, 8, are connected to the register files 10, 12 via a controllable bus network 14. Control signals stored within a control signal register 16 configure the data path elements 2, 4, 6, 8, the register files 10, 12 and the controllable bus network 14 to perform a desired data processing operation or parallel set of operations in a given processor clock cycle. It will be appreciated that typically a large number of control signals are needed to control all these circuit elements and accordingly the control signal register 16 is comparatively wide. Simply storing the control signals within an instruction memory as a program whilst possible is highly inefficient in terms of program memory storage requirements. The control signals within the control signal register 16 are in FIG. 1 derived from an instruction decoder. This instruction decoder, as will be described later, decompresses program instructions that represent desired behaviour in a compact form to yield the full set of control signals needed to control the circuit element illustrated in FIG. 1.

Figure 2:
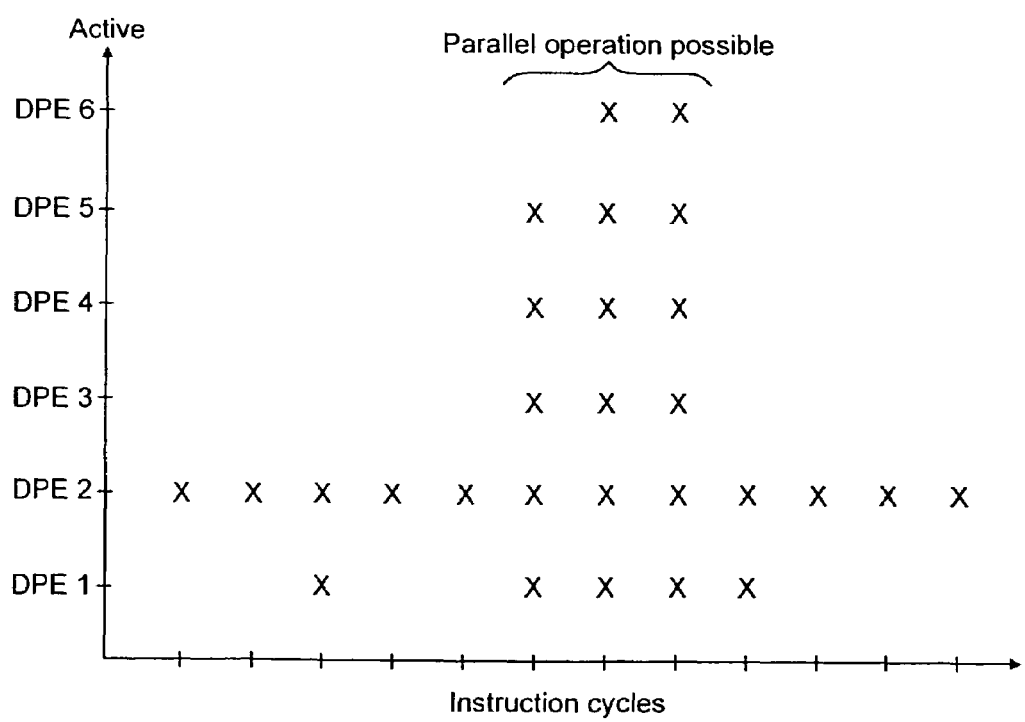
FIG. 2 schematically illustrates the degree of parallelism which may be achieved at different instruction cycles within data processing system operation.

FIG. 2 is a diagram schematically illustrating different possible independent data processing operations which can be performed with different program instructions. As will be seen, in the first section of the instruction cycles of FIG. 2 parallelism is not generally possible with each program instruction being dependent upon completion of a previous instruction, either through a data dependency or by virtue of requiring the same resource. In the middle section of FIG. 2 a portion of code is encountered in which highly parallel operation is possible, such as the parallel processing of pixel or other independent signal values. Within this regime, the full flexibility and complexity of data processing operations which may be specified by full width VLIW instruction words is desirable and advantageous. In the final portion of FIG. 2 the system again returns to a regime in which parallel operation is not exploitable.

Figure 3:
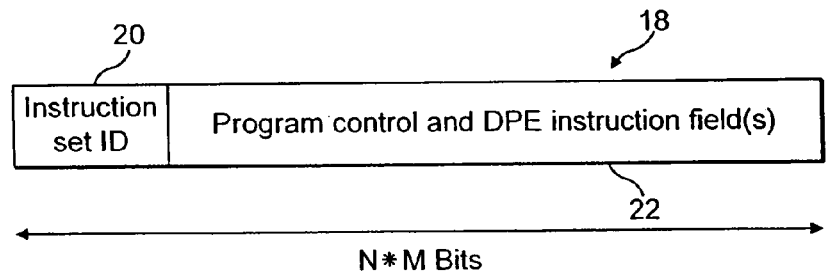
FIG. 3 schematically illustrates a generic program instruction for controlling a VLIW processor that is suitable for use with the current techniques.

FIG. 3 schematically illustrates a generic program instruction according to one example of the present technique. This program instruction 18 includes an instruction identifier field 20 and a section 22 which includes bits specifying control of the VLIW controller itself as well as instruction fields relating to one or more data path elements which it may be desired to use. In this example embodiment, the memory system which stores the program instructions is accessible in N-bit blocks with M such blocks being accessible in parallel. Accordingly, the maximum width of any program instruction 18 is M*N bits. In practice it is convenient to constrain the program instructions to the multiples of N bits in length these all being less than or equal to M*N bits in length.

Figure 4:
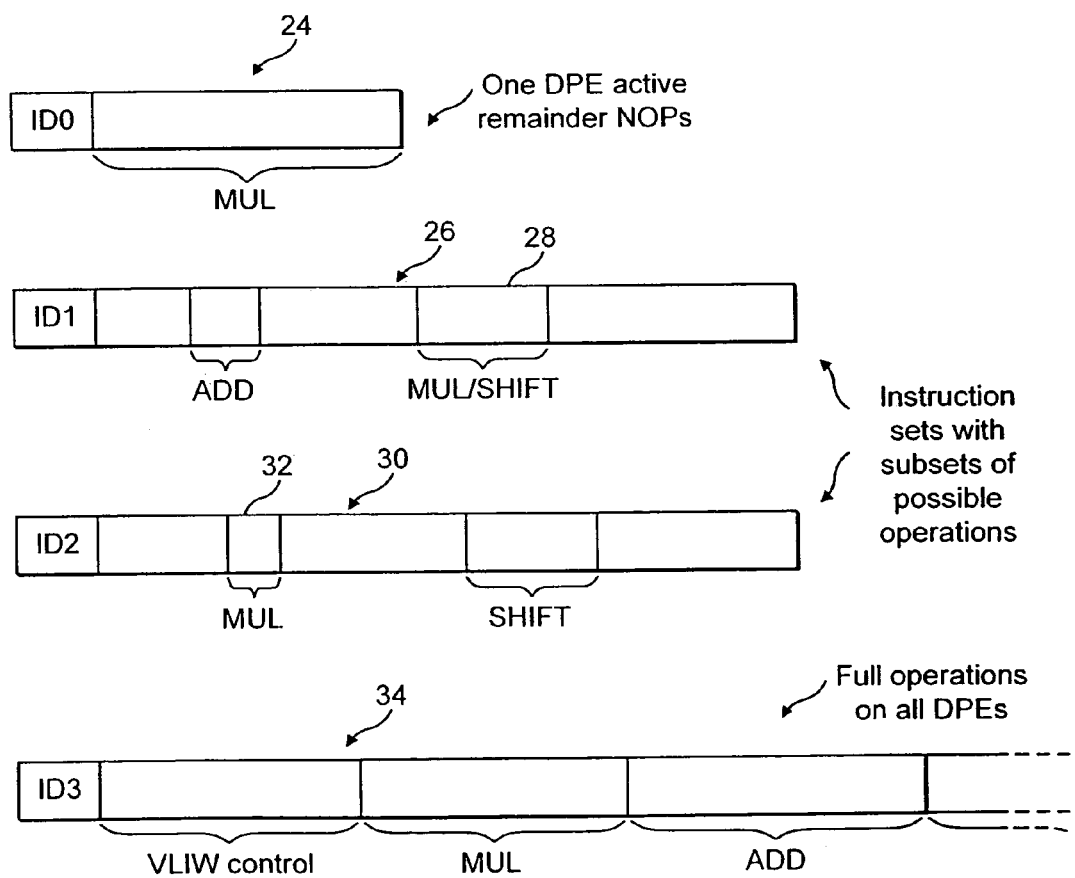
FIG. 4 illustrates four example program instructions having four respective differently encoded instruction fields used to specify a given data processing operation to be performed by a given data path element.

FIG. 4 schematically illustrates four different program instructions from respective different instruction sets which each include an instruction field that can specify a given data path element operation to be performed using different encodings. In program instruction 24, the instruction set is one in which only a single data path element may be addressed by a single program instruction. The program instruction includes within its single instruction field a specifier of which data path element is being addressed as well as the necessary opcodes and operands to control that data path element. The remaining data path elements are either inactive and perform Nops or perform some other default operation, such as continuing a previously started multi-cycle processing operation or responding to some previously established state.

The second program instruction 26 is longer and allows multiple data path elements to be addressed within a single instruction. The bit position and bit length of the instruction field 28 which relates to the multiplier varies compared to that in program instruction 24 and the other instruction. The instruction field length is less and accordingly only a subset of data processing operations of which the multiplier is capable may be specified within this shortened instruction field. The register specifier range may be reduced and/or the immediate value range may be reduced in order to facilitate this shortening of the instruction field length. The more commonly required instructions are chosen to be supported with the subset. In other example instructions, a particularly preferred type of variable for restriction to enable better compression is the jump specifier range since full address space jumps are rare and it is much more common to have relatively short jumps within the program instruction flow. Within this second instruction 26, the instruction field 28 is not dedicated to the multiplier and includes bits which specify whether either the multiplier or the shifter is being addressed by the instruction field concerned.

In the third program instruction 30, a dedicated instruction field 32 is provided which only addresses the multiplier. This dedicated instruction field 32 is smaller still than the instruction field 28 and is at a different bit position.

Finally the fourth illustrated program instruction 34 fully addresses all of the data path elements with individual instruction fields as well as including a VLIW control field which specifies control parameters for the VLIW controller itself.

Figure 5:
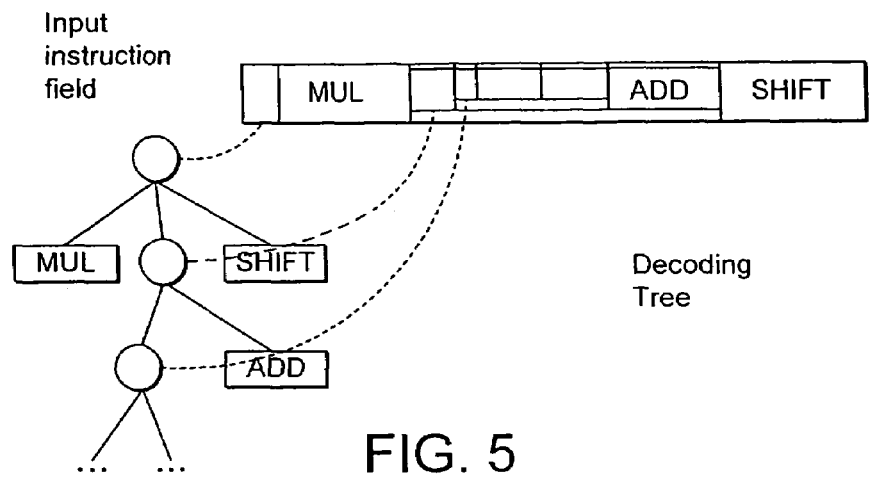
FIG. 5 schematically illustrates a decoding/encoding tree which may be used as part of an instruction compression technique.

FIG. 5 is a diagram schematically illustrating a decoding tree that may be used to decode an input instruction field within a program instruction. At each node the decoding branches to either a definitely specified data path element which is being addressed or a further node at which some further branching can take place. Ultimately, as the decoding tree is traversed the branches will terminate at a specified data path element.

Figure 6:
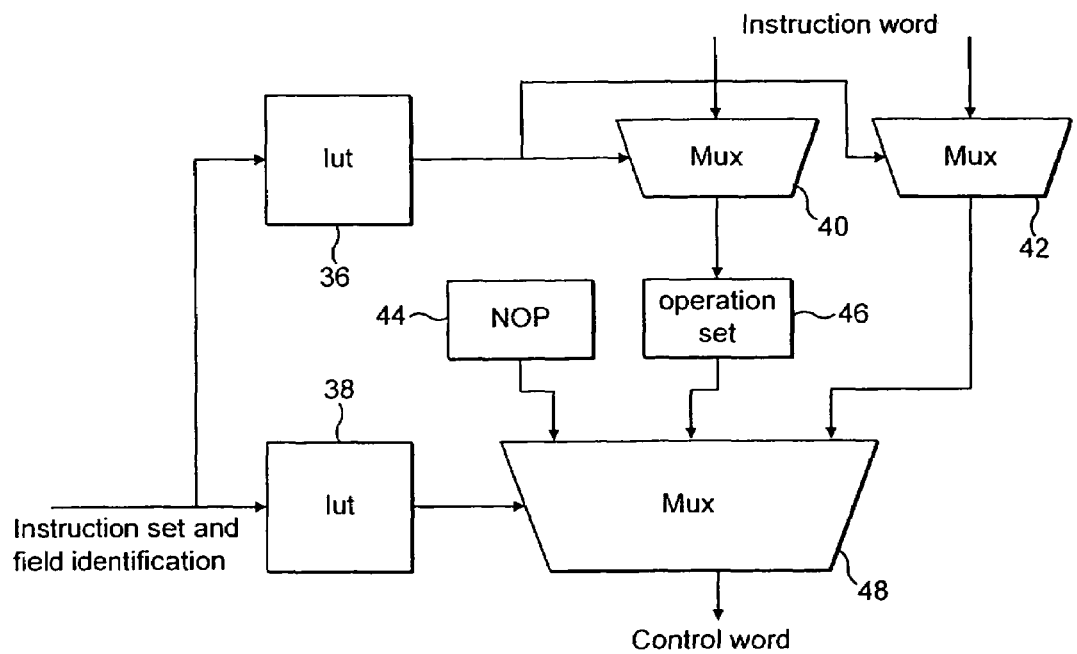
FIG. 6 schematically illustrates a portion for one control word of an instruction decoder.

FIG. 6 schematically illustrates an instruction decoder slice for one dath path element within the processor which serves to decode/decompress the program instructions to form the required control signals. The instruction set identifier and field identification is supplied to two respective look-up-tables 36, 38 which in turn generate multiplexer controlling signals. The block within the decoder comprising the multiplexer 42 serves as an instruction extractor and extracts an appropriate instruction field from within the program instruction concerned. It will be appreciated that the bit position of the instruction field for a given data path element varies for the different encodings and the different instruction sets and accordingly the multiplexers 40, 42 select from across the full span of the program instruction word to pick out the desired instruction field.

The second portion of the instruction decoder takes the selected instruction field and expands it as required to form the full set of control signals required for that data path element. It may be that the multiplexer 42 directly provides this full set of control signals, or alternatively if default Nop operation is required then these signals may be generated by the circuit element 44. In the case of an instruction field which is representing a subset of possible data path element operations using a compressed encoding of the control signals, then the circuit element 46 can expand this compressed representation to form the full set of control signals which are then selected by the multiplexer 48.

Figure 7:
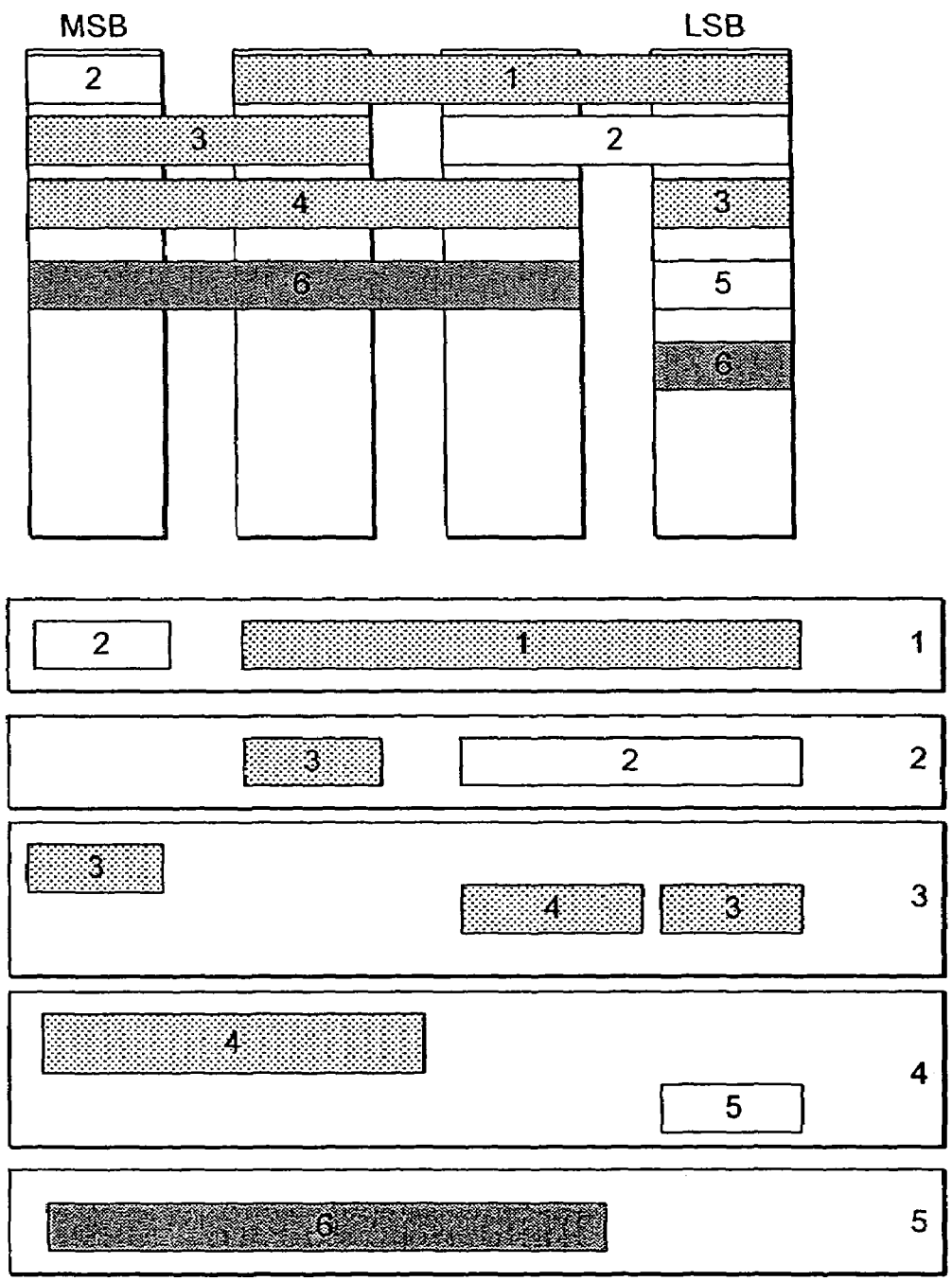
FIG. 7 schematically illustrates one example of the layout of program instructions within a memory which is read with fixed width memory accesses.

FIG. 7 schematically illustrates a memory for storing program instructions implemented as a set of M memories with a width of N bits each. These M memories can all be read in parallel. Between one and M words are read from the memories for every program step. The words that are read are stored in the instruction register 54 (illustrated in FIG. 9). The instruction register acts as a FIFO for code words. The instruction extraction then consists of a read of program words from the instruction register and using a rotator to align these for instruction decoding. FIG. 7 is an example of the distribution of program words over the different memories.

The decoding flow for the instructions shown in FIG. 7 is:
1. cycle 1:
   a. Read 3 code words of instruction 1 and 1 word of instruction 2 into the instruction register.
2. cycle 2:
   a. Read 2 code words of instruction 2 and 1 code word of instruction 3 into the instruction register.
   b. Use the rotator to MSB align instruction 1 at the input of the instruction decoder by rotating it over 1 word and decode it (this is an example with one endianess, but the technique is not limited to such systems).
3. cycle 3:
   a. Read 2 additional code words of instruction 3 and one code word of instruction 4 into the instruction register.
   b. Use the rotator to MSB align instruction 2 at the input of the instruction decoder by rotating it over 2 words and decode it.
4. cycle 4:
   a. Read 2 code words of instruction 4 and instruction 5 into the instruction register.
   b. Use the rotator to MSB align instruction 3 at the input of the instruction decoder by rotating it over 3 words and decode it.
5. cycle 5:
   a. Read 3 code words of instruction 6 into the instruction register.
   b. Decode instruction 4.
6. cycle 5:
   a. Read the last code word of instruction 6 into the instruction register.
   b. Use the rotator to MSB align instruction 5 at the input of the instruction decoder by rotating it over 3 words and decode it.
7. . . . .

Figure 8:
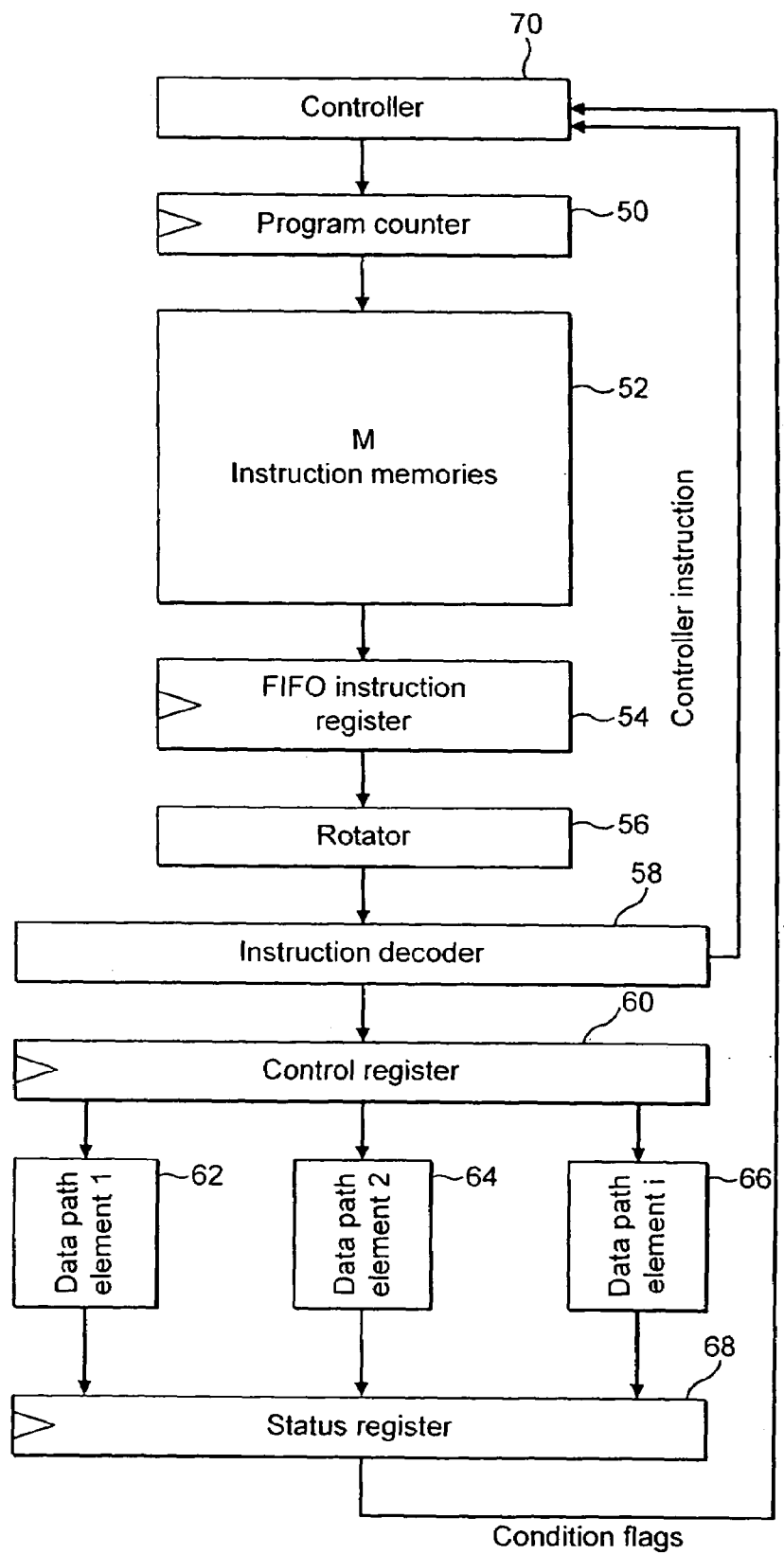
FIG. 8 schematically illustrates a VLIW processor supporting multiple instruction sets, some of which are decoded to decompress them.

FIG. 8 is a schematic high level diagram illustrating an example embodiment of the VLIW processor using the present techniques. A program counter 50 is used to address an instruction memory 52 storing the variable length program instructions. These variable length program instructions are read out as fixed length memory access words into a FIFO instruction register 54 from which the individual program instructions are extracted and aligned by a rotator 56 before being supplied to an instruction decoder 58. The instruction decoder 58 decompresses, as appropriate, these program instructions to produce control signals stored within a control register 60. The control signals configure the different data path elements 62, 64, 66 to perform a desired processing operation with the results being used to update a status register 68 which in turn feeds back to a VLIW controller 70. The VLIW controller 70 controls the program counter to increment appropriately through the program stored within the memory 52.

Figure 9:
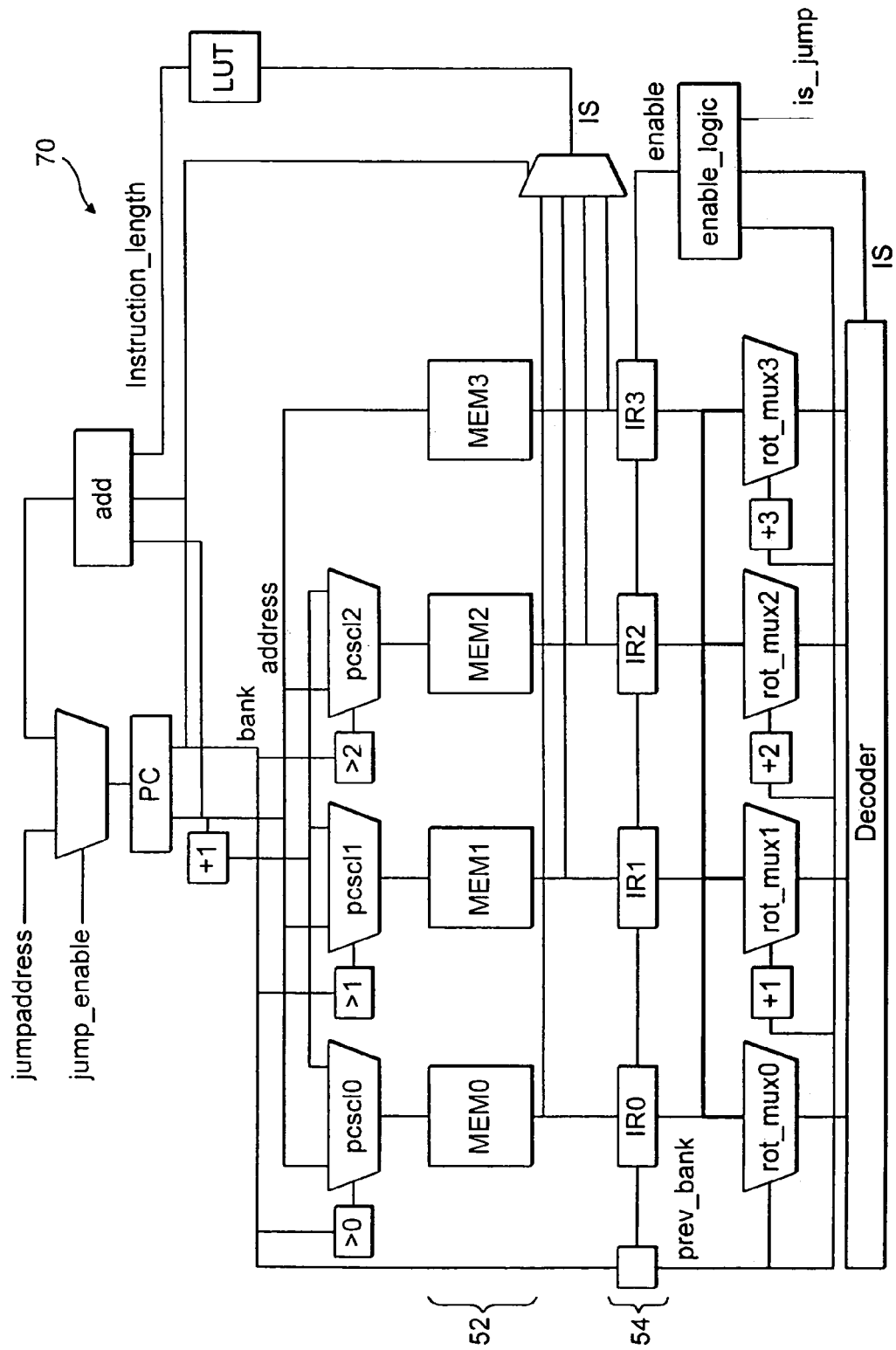
FIG. 9 schematically illustrates the circuit for fetching and aligning program instructions from a memory.

FIG. 9 schematically illustrates one example structure of the controller 70. It will be seen that both the current program counter value and an incremented version of this are maintained such that appropriate memory addresses to address the different memories may be generated when a desired access is unaligned and wrapped around the different memories. Instruction length derived by the instruction set decoder 58 is used to control the program counter advance as well as any required jump commands forcing a jumping program flow control.

The following is an example illustrative of the possible subsets of Alu data path element controls which it may be desired to support within different instruction sets. Other data path elements may have their instruction sets selected/configured in a similar way.

This Alu has 4 control ports that can be independently controlled: cmd0, cmd1, cmd2 and cmd3. When only parts of the ALU are used in an application it doesn't make sense driving all of its parts from the microcode. The user can use instruction set definitions for this purpose.

The alu consists of multiple independent units controlled by a separate commando busses. For each of these commando busses independent an operation set must be defined. The 'full' instruction set of an ALU is generated for ALU "alu_1" as follows when the user has not specified any instruction sets:

```
operation_set("full","alu_1 :
cmd0",["add","sub","passx","passy",
       "incx","incy","decx","decy","aslx",
       "asly","rsub","negx","negy","exor",
       "exnor","or","and","absx","absy",
       "min","max","comx","comy","varshiftright",
       "varshiftleft","const","default"]);         // 5
                                                      bits
operation_set("full","alu_1:
cmd1",["zero","one","two","three",
       "four","five","six","seven","eight",
       "nine","ten","eleven","twelve","thirteen",
       "fourteen","fifteen","thirtyone","sixtythree","fgt",
       "flt","fge","fle","feq","fne",
       "fgtz","fltz","fgez","flez","feqz",
       "fnez","rslt","<#------>","default"]);     // 6
                                                      bits
operation_set("full","alu_1:
cmd2",["upsh","downsh","pass","immediate"]); // 2 bits
operation_set("full","alu_1:
cmd3",["signed","unsigned","X","Y","default"]); // 1 bits
```

The code width of an operation set is determined by the number of instruction in the set. E.g. ceil(log2(#instructions in set)).

```
control_group("CG_alu_1",["reg_dx_alu_1:
ar0:full",
        "reg_dy_alu_1:ar0:full",
        "alu_1:cmd0:full",
        "alu_1:cmd1:full",
        "alu_1:cmd2:full",
        "alu_1:cmd3:full");
```

So, the full instruction set of an ALU is represented by a single control_group "CG_alu_1" which consists of the read addresses of the registers connected to the input pins of the ALU, and of the 'full' operation sets of all control ports of the ALU.

The width of a control group is the sum of the widths of the contained operation sets.

In order to be able to define instruction sets with restricted functionality on the ALU new operation sets and control groups need to be defined. Before this can be done, the user needs to determine which part of the functionality he wants in a specific instruction set.

EXAMPLE 1

When the ALU is only used as a flag control unit, the following definitions should be used:

```
operation_set("fcu","alu_1:
cmd0",["passx","passy","exor","exnor",
        "or","and","comx","comy"]); // 3 bits
operation_set("default","alu_1:cmd1",["default"]);   // 0 bits
operation_set("pass","alu_1:cmd2",["pass"]);         // 0 bits
operation_set("default","alu_1:cmd3",["default"]);   // 0 bits
control_group("CG_fcu_alu_1",[
"reg_dx_alu_1:ar0:full",
    "reg_dy_alu_1:ar0:full",
    "alu_1:cmd0:fcu",
    "alu_1:cmd1:default",
    "alu_1:cmd2:pass",
    "alu_1:cmd3:default"]);
```

Control group "CG_fcu_alu_1" will only contain the read addresses of the input registers and 3 bits to store the instructions for the 'cmd0' control port. The instruction set decoder will automatically apply the default instructions to the 'cmd1' and the 'cmd3' control ports and the pass instruction to the 'cmd2' control port.

EXAMPLE 2

The instruction set for the ALU without the shift unit is specified as follows:

```
operation_set("noshift","alu_1:
cmd0",[ "add","sub","passx","passy",
    "incx","incy","decx","decy","aslx",
    "asly","rsub","negx","negy","exor",
    "exnor","or","and","absx","absy",
    "min","max","comx","comy","default"]); // 5 bits
operation_set("flags","alu_1:
cmd1",["fgt","flt","fge","fle","feq","fne",
    "fgtz","fltz","fgez","flez","feqz",
    "fnez","rslt","default"]);              // 4 bits
control_group("CG_alu_noshift",
["reg_dx_alu_1:ar0:full ",
    "reg_dy_alu_1:ar0:full",
    "alu_1:cmd0:noshift",         // 5 bits
    "alu_1:cmd1:flags",           // 4 bits
    "alu_1:cmd2:pass",            // 0 bits
    "alu_1:cmd3:full"]);          // 1 bit
```

A control bit can be gained by defining a new operation set on the 'cmd' control port. For example, for logical=0 and absminmax=0:

```
operation_set("logical0absminmax0","alu_1:
cmd0",["add","sub","passx",
    "passy", "incx","incy","decx","decy","aslx",
    "asly","rsub","negx","negy","default"]);   // 4
                bits
Operation set "alu_1:cmd:full" can then be replaced in
above control_group definition
by "alu_1:cmd0:logical0absminmax0".
```

EXAMPLE 3

The ALU_NOFLAG can be described by the following definitions.

```
control_group("CG_alu_noflag",[
"reg_dx_alu_1:ar0:full",
    "reg_dy_alu_1:ar0:full",
    "alu_1:cmd0:noshift",         // 5 bits
    "alu_1:cmd1:default",         // 0 bits
    "alu_1:cmd2:pass",            // 0 bits
    "alu_1:cmd3:full");           // 1 bit
```

The following example illustrates the definition of a complete instruction set decoder for a processor with three datapath elements: 1 ALU, 1 RAM and an constant generator. The following operation sets are defined:

```
operation_set("full","ram_1:
rwn",["write","read","default"]); // 2 bits
operation_set("full","immediate_1:
immediate",["<#--------------->"]); // 16 bits
operation_set("full","alu_1 :
cmd0",["add","sub","passx","passy",
    "incx","incy","decx","decy",
    "rsub","negx","negy","exor",
    "exnor","or","and","default"]);   //4 bits
operation_set("addsub","alu_1:
cmd0",["add","sub","incx","decx","default"]); // 2 bits
```

Control groups are simple groupings of control words that will be dealt with in identical ways in the instruction set definitions. The following control groups are defined:

```
control_group("CG_immediate_1",["immediate_1:
immediate:full"]); // 16 bits
control_group("CG_ram_1",["ram_1:
rwn:full"]); // 2 bits
control_group("CG_alu_addsub",["alu_1:
cmd0:addsub"]); // 2 bits
control_group("CG_alu_full_1",["alu_1:
cmd0:full"]); // 4 bits
```

Instruction fields are composed of control groups. Only one control group can be active per instruction fields during any clock cycle. The following instruction fields are defined:

```
instruction_field("TF_1",["CG_immediate_1"]);   // 16 bits
instruction_field("TF_2",["CG_ram_1"]);   // 2 bits
instruction_field("IF_3",["CG_alu_addsub_1"]);   // 2 bits
instruction_field("IF_4",["CG_immediate_1","CG_alu_full_1"]);
//1 + 16 bits
```

Instruction sets are defined as a concatenation of instruction fields. The following instruction sets are defined:

```
instruction_set("IS_VLIW",["IF_1",
"IF_2","IF_3"]);   // 2 + (2 + 2 + 16 ) bits
instruction_set("IS_RISC1",["IF_2","IF_4"]);
// 2 + (1 + 16 ) bits
instruction_set("IS_RISC2",["IF_2","IF_3"]);
// 2 + (2) bits
N = 4 bits
M = 5 banks
```

IS_VLIW controls all datapath elements in parallel. IS_RISC1 controls the ram and either the constant generator or the full functionality of the alu. IS_RISC2 controls the the ram and a subset of the alu functionality.

The computer programs for controlling VLIW processors and including mixed instruction set instructions in accordance with the above techniques represent another aspect of this invention. These computer programs may be provided in the form of products such as data carriers (e.g. disks, ROMs, etc) or as downloadable files or in other ways.

With regard to compiler support instruction sets are stored in a data-structure that explicitly models allowed parallel operations in the set, or its dual, conflicting operations. Operations are conflicting when they use the same resources to operate on non-identical data sets. This data-structure can be used by a compiler for instruction selection and code generation. The instruction words created by the compiler are then selected from any of the defined instruction sets. In one example, this conflict model can be used in a Map step, a Compile step and a Code Generation step. Map selects instructions and assigns them to individual data-path elements. Compile schedules instructions and performs code optimization. At the end of Compile, code is emitted and final instruction set selection takes place. During this code generation step the jump addresses in the code are re-coded to allow for the variable length instruction words, which are stored distributed over multiple memories. In all three steps the cost of instruction sets (in terms of size) is taken into account.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Apparatus for processing data, said apparatus comprising:
   an instruction memory operable to store program instructions and readable in fixed length memory accesses;
   an instruction decoder operable to decode one or more instruction fields within a program instruction to generate at least control signals; and
   a plurality of data path elements responsive to said controls signals independently to perform in parallel respective data processing operations specified by said program instruction, at least some program instructions decoded by said instruction decoder allowing control signals for respective data path elements to be independently specified;
   wherein said instruction decoder is operable such that a given data processing operation to be performed by a data path element can be specified using differently encoded instruction fields in different program instructions;
   wherein said program instructions are divided into a plurality of instruction sets and said instruction decoder is responsive to at least an instruction set identifying field within each program instruction to control which bits within said program instruction correspond to instruction fields for which data path elements, and
   wherein said program instructions have a variable program instruction length and said instruction decoder is responsive to said instruction set identifier to determine program instruction length of a program instruction, wherein a fixed length memory access contains at least portions of a plurality of program instructions, the apparatus further comprising:
   a rotator and a program counter incrementer operable to align program instructions within said memory accesses to a predetermined position for supply to said instruction decoder and wherein said rotator is responsive to said instruction set identifiers to determine what rotation to apply to align said program instructions.

2. Apparatus as claimed in claim 1, wherein said differently encoded instruction fields representing said data processing operation have a different bit length within said different program instructions.

3. Apparatus as claimed in claim 1, wherein said differently encoded instruction fields representing said data processing operation have a different bit position within said different program instructions.

4. Apparatus as claimed in claim 1, wherein said differently encoded instruction fields are operable to represent different sets of data processing operations that can be performed by said data path element.

5. Apparatus as claimed in claim 4, wherein at least one of said differently encoded instruction fields within a program instruction is operable to represent a subset of data processing operations that can be represented by a different one of said differently encoded instruction fields within a different program instruction.

6. Apparatus as claimed in claim 5, wherein a subset has a reduced operand range compared with said maximum set of data processing operations.

7. Apparatus as claimed in claim 6, wherein said operand range may be one of:
   a register specifier;
   a jump address specifier representing a jump in execution point within a program;
   an alignment specifier; and
   an immediate value.

8. Apparatus as claimed in claim 1, wherein at least one instruction field within a program instruction itself specifies which of said plurality of data path elements is controlled by said at least one instruction field.

9. Apparatus as claimed in claim 1, wherein in response to different program instructions variable numbers of said plurality of data path elements are active or inactive.

10. Apparatus as claimed in claim 9, wherein if a data processing operation is not specified or pending for a given data path element, then said given data path element is inactive and performs a Nop operation.

11. A method of processing data, said method comprising the steps of:
   decoding one or more instruction fields within a program instruction to generate at least control signals; and
   in response to said controls signals controlling a plurality of data path elements independently to perform in parallel respective data processing operations specified by said program instruction, at least some program instructions allowing control signals for respective data path elements to be independently specified;
   wherein a given data processing operation to be performed by a data path element can be specified using differently encoded instruction fields in different program instructions;
   wherein said program instructions are divided into a plurality of instruction sets and said instruction decoder is responsive to at least an instruction set identifying field within each program instruction to control which bits within said program instruction correspond to instruction fields for which data path elements, wherein said program instructions have a variable program instruction length and said instruction decoder is responsive to said instruction set identifier to determine program instruction length of a program instruction, wherein an instruction memory stores said program instructions and is readable in fixed length memory accesses, wherein a fixed length memory access contains at least portions of a plurality of program instructions, and wherein a rotator and a program counter incrementer operate to align program instructions within said memory accesses to a predetermined position for supply to said instruction decoder and said rotator is responsive to said instruction set identifiers to determine what rotation to apply to align said program instructions.

12. A method as claimed in claim 11, wherein said differently encoded instruction fields representing said data processing operation have a different bit length within said different program instructions.

13. A method as claimed in claim 11, wherein said differently encoded instruction fields representing said data processing operation have a different bit position within said different program instructions.

14. A method as claimed in claim 11, wherein said differently encoded instruction fields are operable to represent different sets of data processing operations that can be performed by said data path element.

15. A method as claimed in claim 14, wherein at least one of said differently encoded instruction fields within a program instruction is operable to represent a subset of data processing operations that can be represented by a different one of said differently encoded instruction fields within a different program instruction.

16. A method as claimed in claim 15, wherein said subset has a reduced operand range compared with a maximum set of data processing operations.

17. A method as claimed in claim 16, wherein said operand range may be one of:
a register specifier;
a jump address specifier representing a jump in execution point within a program;
an alignment specifier; and
an immediate value.

18. A method as claimed in claim 11, wherein at least one instruction field within a program instruction itself specifies which of said plurality of data path elements is controlled by said at least one instruction field.

19. A method as claimed in claim 11, wherein in response to different program instructions variable numbers of said plurality of data path elements are active or inactive.

20. A method as claimed in claim 19, wherein if a data processing operation is not specified or pending for a given data path element, then said given data path element is inactive and performs a Nop operation.

21. A computer program product for controlling an apparatus for processing data having an instruction decoder operable to decode one or more instruction fields within a program instruction to generate at least control signals and a plurality of data path elements responsive to said controls signals independently to perform in parallel respective data processing operations specified by said program instruction, said computer program product comprising:

at least one program instruction including an instruction field with a first encoding specifying a given data processing operation to be performed by a data path element; and at least one different program instruction including a differently encoded instruction field with a second encoding different to said first encoding and specifying said given data processing operation to be performed by said data path element, wherein said program instructions are divided into a plurality of instruction sets and said instruction decoder is responsive to at least an instruction set identifying field within each program instruction to control which bits within said program instruction correspond to instruction fields for which data path elements, wherein said program instructions have a variable program instruction length and said instruction decoder is responsive to said instruction set identifier to determine program instruction length of a program instruction wherein an instruction memory is operable to store said program instructions and readable in fixed length memory accesses, wherein a fixed length memory access contains at least portions of a plurality of program instructions, and wherein a rotator and a program counter incrementer are operable to align program instructions within said memory accesses to a predetermined position for supply to said instruction decoder and said rotator is responsive to said instruction set identifiers to determine what rotation to apply to align said program instructions.

22. A computer program product as claimed in claim 21, wherein said differently encoded instruction fields representing said data processing operation have a different bit length within said different program instructions.

23. A computer program product as claimed in claim 21, wherein said differently encoded instruction fields representing said data processing operation have a different bit position within said different program instructions.

24. A computer program product as claimed in claim 21, wherein said differently encoded instruction fields are operable to represent different sets of data processing operations that can be performed by said data path element.

25. A computer program product as claimed in claim 24, wherein at least one of said differently encoded instruction fields within a program instruction is operable to represent a subset of data processing operations that can be represented by a different one of said differently encoded instruction fields within a different program instruction.

26. A computer program product as claimed in claim 25, wherein said subset has a reduced operand range compared with a maximum set of data processing operations.

27. A computer program product as claimed in claim 26, wherein said operand range may be one of:
a register specifier;
a jump address specifier representing a jump in execution point within a program;
an alignment specifier; and
an immediate value.

28. A computer program product as claimed in claim 21, wherein at least one instruction field within a program instruction itself specifies which of said plurality of data path elements is controlled by said at least one instruction field.

29. A computer program product as claimed in claim 21, wherein in response to different program instructions variable numbers of said plurality of data path elements are active or inactive.

30. A computer program product as claimed in claim 29, wherein if a data processing operation is not specified or pending for a given data path element, then said given data path element is inactive and performs a null operation.

* * * * *